Feb. 16, 1960

B. M. EDSALL 2,924,992

PARALLEL TORQUE PATH TRANSMISSION

Filed June 17, 1955

INVENTOR
Bruce M. Edsall
BY
W. C. Middleton
ATTORNEY

United States Patent Office 2,924,992
Patented Feb. 16, 1960

2,924,992

PARALLEL TORQUE PATH TRANSMISSION

Bruce M. Edsall, Oak Park, Mich., assignor to General Motors Corporation, Detroit, Mich., a corporation of Delaware Application June 17, 1955, Serial No. 516,075

9 Claims. (Cl. 74—688)

This invention relates to parallel torque path transmissions and more particularly to such transmissions in which provision is made in one path for multiplying torque, and in which provision is made in the other path for transmitting torque at a substantially 1:1 ratio, or for interrupting the transmission of torque therethrough.

Hydrodynamic drive devices such as torque converters and fluid couplings have characteristics which render them especially adaptable for different transmission functions. For example, a torque converter can be operated to multiply torque and also to act as a fluid coupling, while a fluid coupling serves simply to transmit torque efficiently at a substantially 1:1 ratio. However, a converter which may be especially efficient as a multiplier of torque may not be as well adapted for serving as a fluid coupling. A transmission therefore which can employ the best features of both types of drive devices can be utilized for better results.

An object of the present invention is to provide a transmission for transmitting torque between an input shaft and an output shaft through parallel torque paths with provision in one path for multiplying torque and with provision in the other path for transmitting torque at a substantially 1:1 ratio or for interrupting the transmission of torque therethrough.

Another object of the invention is to provide a transmission as just described in which the parallel paths are differentially driven by the input shaft with the output of the two paths connected to the output shaft and in which mechanism is provided whereby when the transmission of torque through one of the paths is interrupted the entire input torque will be transmitted through the other path.

Another object of the invention is to provide a parallel torque path transmission wherein one path has included therein a hydrodynamic torque converter, and the other path has therein a hydrodynamic fluid coupling, which can be filled or emptied, to control the transmission of torque through such path.

A further object of the invention is to provide a transmission as just described in which mutual reaction is afforded by the two paths so that they can be differentially driven with a one-way clutch between the input shaft and the driving part of one of the paths so that this path is compelled to rotate at least as fast as the input shaft when the second path is offering no reaction.

An additional object of the invention is to provide a transmission as just described in which the torque path having the torque converter therein also includes mechanism for multiplying torque.

In carrying out the foregoing and other objects of the invention, a transmission incorporating one embodiment thereof is so constructed as to have two parallel paths differentially driven through the agency of a planetary gear unit. The source of motive power, such as an engine, has the drive shaft thereof connected to drive the planet carrier of the gear set while the ring gear thereof serves as the torque input member of one path and the sun gear serves as a torque input member of the other path. One path has included therein a torque converter which may be of any well known type, from a simple three element converter to a multi-stage polyphase converter. The output of this converter is connected to drive the output shaft of the transmission. The other path includes therein a fluid coupling the pump of which is driven by one of the gears of the planetary gear set and the turbine of which is connected to drive the output shaft along with the output from the first path. This fluid coupling can be rendered operative or inoperative to transmit torque by filling or emptying the same either at the will of the operator or automatically as may be desired. Inasmuch as it is usually advantageous in transmissions of this type, particularly for motor vehicles, to employ as much torque multiplication as possible during the initiation of movement of the vehicle, the present invention makes possible the transmission of the entire torque through that path having the torque multiplication device therein. This can be accomplished by rendering the second path inoperative to transmit torque and by compelling the input of the first path to rotate at least as fast as the input shaft. A one-way clutch makes possible this arrangement since when the second path is inoperative to transmit torque, it offers no reaction for the differential drive of the first path and hence some means must be supplied for compelling the input of this first path to rotate with the input shaft.

In another embodiment of the invention two parallel torque paths are again provided respectively with a torque converter and a fluid coupling but in addition to the torque multiplication afforded by the converter, additional torque multiplication is obtained by the inclusion in this path of a suitable mechanical torque multiplier such as a gear set, either of planetary form, or of any other desired form. In this embodiment of the invention, the output of the torque converter is arranged to drive the input of the gear set while the output of the gear set is connected to the output shaft to which is also connected the turbine of the fluid coupling in the second path. The advantages found to reside in these arrangements will be described in more detail in connection with the description of the accompanying drawings wherein:

Figure 1:
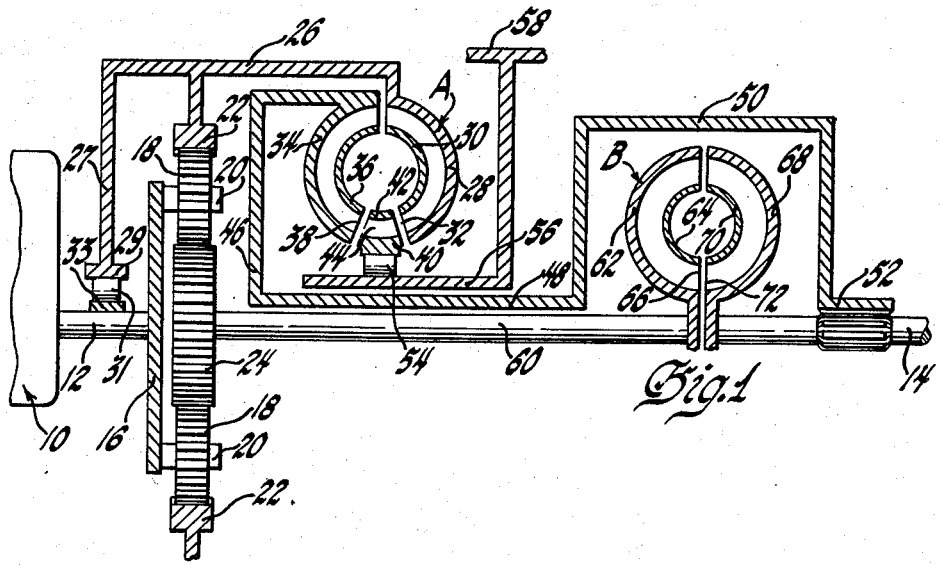
Figure 1 is a schematic diagram of one embodiment of the invention.

Referring to the drawings and particularly to Figure 1, 10 indicates generally a source of motive power such as an internal combustion engine or the like employed in an automotive vehicle. The output shaft of this source of power 10 is indicated at 12 and this shaft will hereinafter be referred to as the input shaft for the transmission. The output shaft for the transmission is shown at 14. The input shaft 12 is connected to drive a planet carrier 16 having planet pinions 18 rotatable about the axes of shafts 20. The pinions 18 mesh with a ring gear 22 and with a sun gear 24.

The ring gear 22 and the sun gear 24 serve as driving members for the two parallel torque paths between the input shaft 12 and the output shaft 14. The first torque path, i.e., that driven by the ring gear 22 has therein a hydrodynamic torque converter indicated at A while the second torque path, i.e., that driven by sun gear 24 has therein a hydrodynamic fluid coupling indicated at B. Connected to ring gear 22 in the first torque path is a rotatable member 25 connected to the outer shroud 28 of the pump of the torque converter A. This pump also has an inner shroud 30 and blades 32 between shrouds 28 and 30. The other elements of the torque converter comprise a turbine having outer shroud 34 and inner shroud 36 and blades 38 therebetween, in addition to a reaction member or stator having an inner shroud 40, an outer shroud 42 and blades 44 therebetween. The turbine of the converter is connected to a rotatable member 46 which is shaped to have a sleeve shaft portion 48 and an enlarged portion 50 surrounding the fluid coupling B. The terminal part 52 of this rotatable member is splined to the output shaft 14. Reverse rotation of the stator or reaction member of the converter is prevented by one-way brake members 54 such as rollers or sprags positioned between the inner shroud 40 and a stationary sleeve 56 secured to the casing of the transmission 58 or to some other structure in such fashion as to be incapable of rotation in either direction.

The second torque path, i.e., that driven by sun gear 24 includes an intermediate shaft 60 connected to drive the pump of the fluid coupling B. This pump has an outer shroud 62, an inner shroud 64 and blades 66 therebetween. The turbine of this fluid coupling has an outer shroud 68, an inner shroud 70 and blades 72 therebetween. The turbine of the coupling is connected directly to the output shaft 14. It is to be understood that the fluid coupling can be filled with liquid at any time, or can be emptied as conditions may require but controls for such filling and emptying are not shown since they constitute no part of this invention.

Since the planetary gear set made up of the carrier 16 with pinions 18 supported thereby, sun gear 22 and ring gear 24 is designed to supply energization for the two torque paths in a manner to require a division of torque therebetween in accordance with the reaction afforded one path by the other path. Should the second torque path having the fluid coupling B therein be inoperative to transmit torque, for example, when the coupling is emptied, some provision must be made for compelling the transmission of torque by the first path, and for this reason the member 26 driven by ring gear 22 has a radial extension 27 terminating in a race 29 for one-way clutch including elements 31 which may be rollers or sprags. The other race 33 of this one-way clutch is secured to the input shaft 12. The one-way clutch made up of the parts 29, 31 and 33 is of such character as to prevent the member 26 and the ring gear 22 from rotating slower than the input shaft 12. Consequently, if reaction is lacking in the torque path including sun gear 24, the ring gear 22 will be compelled to rotate as fast as the input shaft 12 and carrier 16 which, in effect, locks up the gear set and compels sun gear 24 to rotate also at input shaft speed thereby causing rotation of shaft 60 and the pump of the fluid coupling B. With this coupling empty, rotation of the pump of the coupling B is ineffective to transmit torque to the turbine and thence to the output shaft 14.

The transmission of Figure 1 is capable of several different modes of operation. For example, if it is desired to provide maximum torque for initiating movement of a vehicle driven by the output shaft 14, such condition can be obtained by emptying the fluid coupling B. Drive of the input shaft by the source 10 will then cause the entire input torque to be transmitted through the first path having the torque converter A therein. Such transmission of the entire input torque through this path is assured by the action of the one-way clutch compelling the ring gear 22, and parts connected to be driven thereby, to be rotated at input shaft speed and at the same time no torque is transmitted by the path including the sun gear 24. With all of the torque then continuing through the first path, the action thereof is to cause multiplication of torque by the converter A in the well known fashion, which multiplied torque continues through the driving member including parts 46, 48, 50 and 52 to the output shaft 14. The maintenance of torque transmission solely through the first path can be continued as long as desired but when the converter ceases to multiply torque and acts as a coupling with the reaction member rotating in the same direction as the pump and turbine (permitted by the one-way break elements 54), it may be desirable to cause some of the torque to be transmitted through the second path including the coupling B. Such division or torque can be arranged by filling the coupling B so that rotation of sun gear 24 rotates the pump of the coupling which in turn will cause rotation of the turbine connected to the output shaft 14. Under these conditions torque is being transmitted through both paths with the division of torque through the paths being dependent upon the gear ratio existing between the ring gear 22 and sun gear 24 and upon the torque capacities of the converter A and the fluid coupling B. These two hydrodynamic drive devices can be of such size and construction as to be capable of transmitting any desired ratio of torque so that when both paths are active and are supplying mutual reaction to each other through the differential inputs, the division of torque through the paths can be predetermined. For example, the torque capacity of the coupling can be made greater than the normal capacity of the converter, when operating as a coupling, so that a greater percentage of input torque can be transmitted through the second path.

If less torque multiplication is required in the initial operation of the transmission to accelerate the vehicle driven thereby, the coupling can be filled prior to drive by the input shaft 12 with the result that a division of torque will be immediately made between the two paths with multiplication thereof taking place only in the first path which has the torque converter A therein. The division of input torque at the predetermined ratio is maintained by the differential drive of the paths which have their outputs connected together for mutual reaction between the paths. Thus the overall torque multiplication between the input shaft 12 and the output shaft 14 can be made materially lower than that which can be obtained by causing all of the input torque to be transmitted through the first or converter path.

Figure 2:
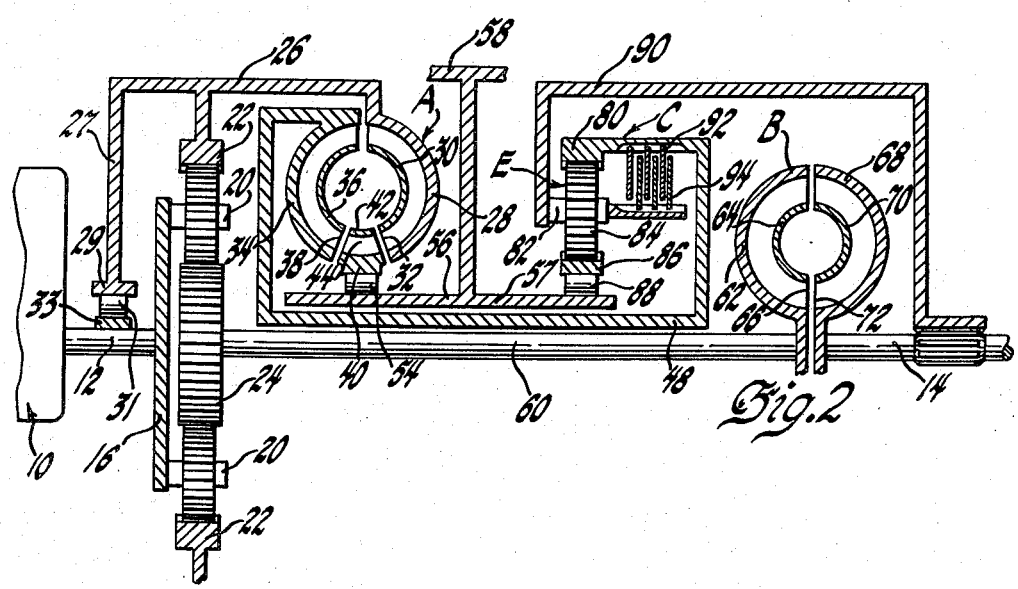
Figure 2 is a similar representation of a modified form of the invention.

In the modification of Figure 2 the essential parts are similar in all details to those of Figure 1 and the same reference characters have been applied thereto. The Figure 2 embodiment, however, differs from that of Figure 1 in that the part 48 driven by the turbine of the torque converter A is connected to drive the ring gear 80 of a planetary unit E which also has a planet carrier 82 rotatable supporting planet pinions 84 meshing with the ring gear 80 and with sun gear 86. This sun gear 86 has a part thereof forming the outer race of a one-way brake having the one-way elements 88, of either roller or sprag form, and a stationary sleeve 57 extended from stationary sleeve 56. The one-way brake including elements 88 operates to prevent reverse rotation of the sun gear 86 so that this sun gear can furnish the necessary reaction for driving the planet carrier 82 in the same direction that ring gear 80 is driven but at a reduced speed. The carrier 82 in turn is connected by the connection member 90 to the output shaft 14.

The operation of this modified transmission is substantially the same as that of the Figure 1 embodiment with the exception that the first torque path can also be operated to provide a mechanical multiplication of torque through the planetary gear unit 80, 82, 84, and 86, in addition to that torque multiplication which is provided by the converter A. Consequently initial drive can be transmitted from the input shaft 12 to the output shaft 14 solely through the first torque path with converter A therein and with the planetary gear unit operating to provide reduction drive. If desired, the entire torque can be transmitted through this first torque path with the torque multiplication supplied by the converter alone used for initial drive to obtain such condition, it being understood that the clutch C, made up of plates 92, splined to an extension of the ring gear 80 and clutch plates 94 splined to an extension of the carrier 82 are forced into engagement. The engagement of these clutch plates to cause the ring gear 80 to rotate in unison with the carrier 82 can be accomplished hydraulically, mechanically, or in any other desired well known manner.

The Figure 2 embodiment of the transmission can also be operated with the second torque path transmitting torque by filling the coupling B either at the initiation of the drive by the transmission or at any time subsequent thereto. Inasmuch as the outputs of the two torque paths are connected together and must rotate in unison with the output shaft it follows that as in the previous embodiment these two torque paths offer mutual reaction one to the other so that when both paths are transmitting torque, the division of torque therebetween is in accordance with the gear ratio established in the planetary input differential unit. It is to be understood that the gear set in the first path is merely illustrative of the possibilities of this transmission and that any other gear arrangement, or mechanical torque multiplier may be used.

From the foregoing it will be seen that the present invention in either embodiment provides a new and useful transmission taking advantage of the characteristics of torque converters and fluid couplings and each transmission is capable of being operated in any of a various number of ways as may be selected by one operating a vehicle having this transmission incorporated in the drive mechanism thereof. It will therefore be understood that the invention, being capable of modification beyond the illustrated embodiment, is to be limited only by the scope of the following claims.

What is claimed is:

1. In a transmission, an input shaft, an output shaft, parallel torque paths between said shafts, a planetary differential gear unit having a driving element connected to said input shaft and driven elements connected respectively to said torque paths, the outputs of said torque paths being connected to said output shaft, the first of said paths having torque multiplying means therein, the second of said paths having means therein controllable at will for transmitting torque in either direction at a ratio of substantially unity and for interrupting the transmission of torque therethrough, the division of torque between said paths being determined by the ratio of said planetary differential gear unit, and a one way clutch for compelling the driven element connected to said first path to be driven at least as fast as said input shaft when transmission of torque through said second path is interrupted whereby the entire input torque is transmitted through said first path.

2. In a transmission, an input shaft, an output shaft, parallel torque paths between said shafts, the first of said paths having a hydrodynamic torque converter therein, the second of said paths having a fluid coupling therein, said coupling when filled transmitting torque at a ratio of substantially unity and when empty interrupting the transmission of torque therethrough, and a one-way clutch between said input shaft and said first path for compelling the input of said first path to rotate at least as fast as said input shaft when transmission of torque through said second path is interrupted whereby the entire input torque is transmitted through said first path.

3. In a transmission, an input shaft, an output shaft, parallel torque paths between said shafts, the first of said paths having a hydrodynamic torque converter therein, the second of said paths having a fluid coupling therein, said coupling when filled transmitting torque at a ratio of substantially unity and when empty interrupting the transmission of torque therethrough, said first path also having gearing therein for providing torque multiplication in addition to that of said torque converter, and a one-way clutch between said input shaft and said first path for compelling the input of said first path to rotate at least as fast as said input shaft when transmission of torque through said second path is interrupted whereby the entire input torque is transmitted through said first path.

4. In a transmission, an input shaft, an output shaft, parallel torque paths between said shafts, a planetary differential gear unit having a driving element connected to said input shaft and having driven elements connected respectively to said paths, the outputs of said paths being connected to said output shaft, the first of said paths having a torque converter therein, the second of said paths having a fluid coupling therein, said fluid coupling when filled transmitting torque at a ratio of substantially unity and when empty interrupting the transmission of torque therethrough, said first path also having gearing therein between said torque converter and said output shaft for providing torque multiplication in addition to that of said torque converter.

5. In a transmission, an input shaft, an output shaft, parallel torque paths between said shafts, a planetary differential gear unit having a driving element connected to said input shaft and having driven elements connected respectively to said paths, the outputs of said paths being connected to said output shaft, the first of said paths having a torque converter therein, the second of said paths having a fluid coupling therein, said fluid coupling when filled transmitting torque at a ratio of substantially unity and when empty interrupting the transmission of torque therethrough, the division of input torque to said torque paths being determined by the ratio of said differential gear unit, said first path also having gearing therein between said torque converter and said output shaft for providing torque multiplication in addition to that of said torque converter.

6. In a transmission, an input shaft, an output shaft, parallel torque paths between said shafts, a plentary differential gear unit having a driving element connected to said input shaft and having driven elements connected respectively to said paths, the outputs of said paths being connected to said output shaft, the first of said paths having a torque converter therein, the second of said paths having a fluid coupling therein, said fluid coupling when filled transmitting torque at a ratio of substantially unity and when empty interrupting the transmission of torque therethrough, and a one-way clutch between said input shaft and said first path for compelling the driven gear element connected to said first path to rotate at least as fast as said input shaft when transmission of torque through said second path is interrupted whereby the entire input torque is transmitted through said first path.

7. In a transmission, an input shaft, an output shaft, parallel torque paths between said shafts, a planetary differential gear unit having a driving element connected to said input shaft and having driven elements connected respectively to said paths, the outputs of said paths being connected to said output shaft, the first of said paths having a torque converter therein, the second of said paths having a fluid coupling therein, said fluid coupling when filled transmitting torque at a ratio of substantially unity and when empty interrupting the transmission of torque therethrough, the division of input torque to said torque paths being determined by the ratio of said differential gear unit, and a one-way clutch between said input shaft and said first path for compelling the driven gear element connected to said first path to rotate at least as fast as said input shaft when transmission of torque through said second path is interrupted whereby the entire input torque is transmitted through said first path.

8. In a transmission, an input shaft, an output shaft, parallel torque paths between said shafts, a planetary differential gear unit having a driving element connected to said input shaft and having driven elements connected respectively to said paths, the outputs of said paths being connected to said output shaft, the first of said paths having a torque converter therein, the second of said paths having a fluid coupling therein, said fluid coupling when filled transmitting torque at a ratio of substantially unity and when empty interrupting the transmission of torque therethrough, said first path also having gearing therein between said torque converter and said output shaft for providing torque multiplication in addition to that of said torque converter, and a one-way clutch between said input shaft and said first path for compelling the driven gear element connected to said first path to rotate at least as fast as said input shaft when transmission of torque through said second path is interrupted whereby the entire input torque is transmitted through said first path.

9. In a transmission, an input shaft, an output shaft, parallel torque paths between said shafts, a planetary differential gear unit having a driving element connected to said input shaft and having driven elements connected respectively to said paths, the outputs of said paths being connected to said output shaft, the first of said paths having a torque converter therein, the second of said paths having a fluid coupling therein, said fluid coupling when filled transmitting torque at a ratio of substantially unity and when empty interrupting the transmission of torque therethrough, the division of input torque to said torque paths being determined by the ratio of said differential gear unit, said first path also having gearing therein between said torque converter and said output shaft for providing torque multiplication in addition to that of said torque converter, and a one-way clutch between said input shaft and said first path for compelling the driven gear element connected to said first path to rotate at least as fast as said input shaft when transmission of torque through said second path is interrupted whereby the entire input torque is transmitted through said first path.

References Cited in the file of this patent

UNITED STATES PATENTS

| | | |
|---|---|---|
| 2,270,515 | Dodge | Jan. 20, 1942 |
| 2,351,213 | James | June 13, 1944 |
| 2,572,310 | Brown | Oct. 23, 1951 |
| 2,687,657 | Kugel | Aug. 31, 1954 |